UNITED STATES PATENT OFFICE.

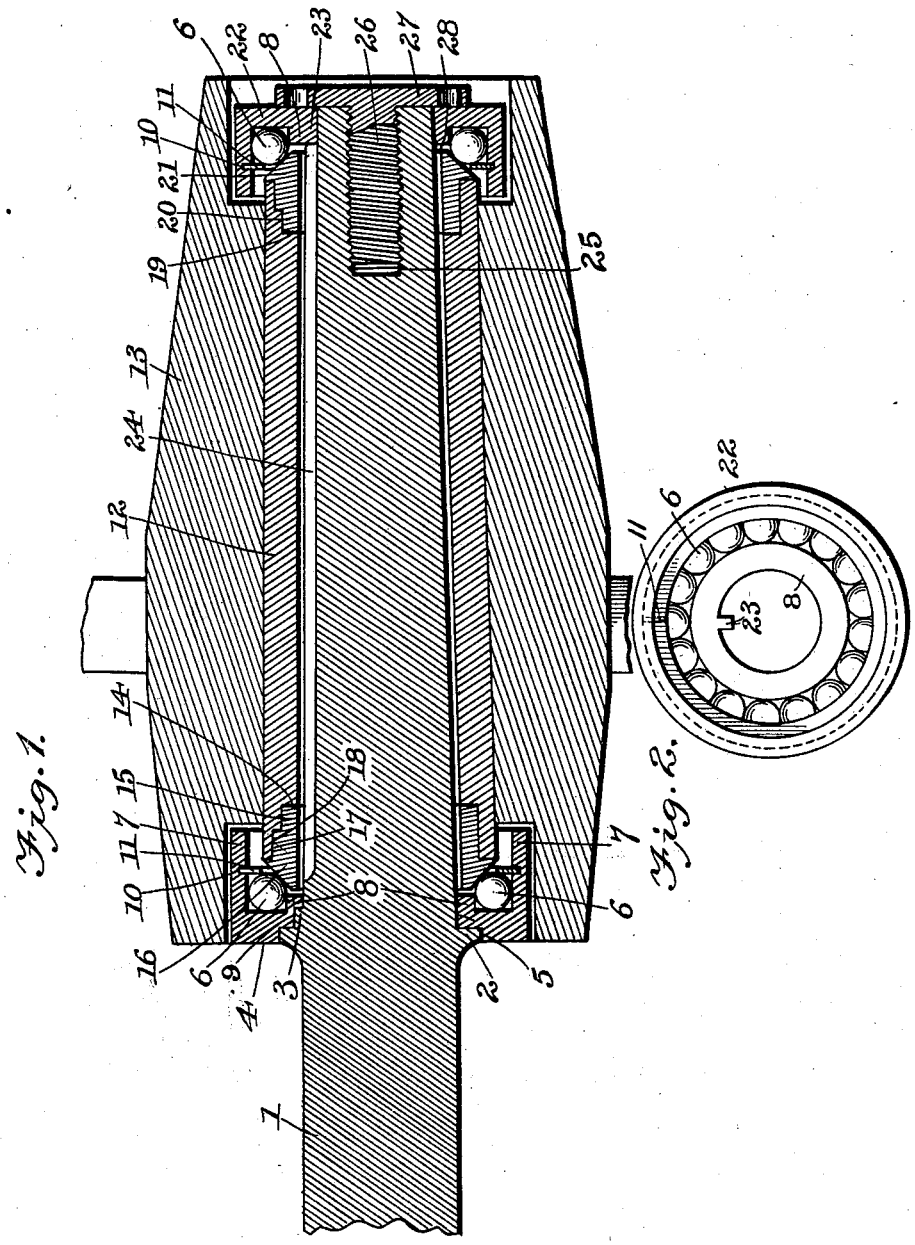

WILLIAM HENRY MAKUTCHAN, OF PRINCETON, ILLINOIS.

BALL-BEARING.

SPECIFICATION forming part of Letters Patent No. 591,482, dated October 12, 1897.

Application filed February 23, 1897. Serial No. 624,687. (No model.)

*To all whom it may concern:*

Be it known that I, WILLIAM HENRY MA-KUTCHAN, a citizen of the United States, residing at Princeton, in the county of Bureau and State of Illinois, have invented a new and useful Ball-Bearing for Wheel-Vehicles, of which the following is a specification.

This invention relates to ball-bearings for wheel-vehicles, its object being to simplify the construction of these devices, whereby they will be less liable to get out of repair, and which is so constructed that in the event an accident should happen to the balls leather washers may be substituted for temporary use.

With these ends in view the invention consists in the several details of construction and combination of parts hereinafter fully described, and particularly pointed out in the claim.

In the drawings, Figure 1 is a longitudinal section through a portion of the axle and the wheel-hub embodying my improvements. Fig. 2 is a plan view of one of the ball-cups, detached.

Similar reference-numerals indicate similar parts in both figures.

1 represents the axle, and 2 is a collar formed integral with the axle, or it may be rigidly secured thereto in any approved manner. The axle is provided with a lug 3, projecting from its periphery close to the collar 2.

4 represents a ball-cup adapted to fit over the axle and having an annular recess 5 formed in its rear face to fit over the shoulder 2 on the axle. The balls 6 are supported between two concentric annular flanges, (indicated by 7 and 8,) the outer flange 7 being longer than the inner flange 8, and the latter is provided with a recess 9, into which the lug 3 on the axle projects, thereby locking the cup against rotary movement on the axle. The outer flange 7 is provided on its interior face with an annular groove 10, into which a ring 11 is fitted to engage the balls and prevent their falling out of the cup when the wheel is removed from the axle. This ring is preferably of spring metal and is split in order that it may be readily sprung into the groove 10 or removed therefrom, in the event it should be necessary to remove either of the balls from the cup.

12 represents the axle-box, which is secured to the hub 13 in the usual manner. The axle-box is provided at its rear end with an annular recess in its inner face, as indicated by 14, into which the stem 15 of the cone 16 fits. The cone 16 bears against the inner surface of the balls 6 and no portion of the cone projects beyond the periphery of the box and it is, therefore, not necessary to cut away the wood of the hub any more than usual in order to fit it to the box and use it with this ball-bearing. The stem 15 is provided with a lug 17, projecting from its periphery into a suitable recess 18, formed in the axle-box, and thereby locking the axle-box and cone together to have common rotation. The front end of the axle-box is also provided with an annular recess 19 in its inner face to receive the stem 20 of the cone 21, which is also locked to the axle-box to revolve with it.

22 represents a ball-cup which is provided with an annular groove 10, into which a split spring-ring 11 is sprung, in the same manner as in the ball-cup 4, before described, for the purpose of holding the balls 6 in the cup when the wheel in removed. The inner flange 8 of the ball-cup 22 is provided with a lug 23, which projects into the end of the oil-groove 24, formed in the axle 1 in the usual manner. This lug 23 locks the ball-cup 22 against rotary movement on the axle 24. The end of the axle is bored longitudinally, as indicated at 25, and this opening is screw-threaded for the reception of the screw 26, which has a flat head 27, adapted to cover the joint between the ball-cup and the axle and lock the cup against endwise movement on the axle.

In the event an accident should happen to one or more of the balls in either cup and they could not be readily replaced all of the balls may be removed from the cup and leather washers interposed in the spaces 28 between the ends of the cones and the adjacent end of the inner flanges 8 of the ball-cups.

From the foregoing description it will be seen that I have produced a very simple ball-bearing for a vehicle-axle, which cannot readily get out of repair and the parts of which may be readily disassociated for the purpose of making any necessary repairs, and also that in the event that it is not convenient or desirable to use the balls leather washers may be used to fill up the space between the parts caused by the absence of the balls and the parts will work as in the ordinary constructions.

It will be understood that changes in the form, proportion, and minor details of construction may be resorted to without departing from the spirit or sacrificing any of the advantages of this invention.

Having thus described my invention, what I claim is—

The combination of an axle, an axle-box mounted thereon and provided at each end with an interior annular recess, a ball-cup detachably connected to the axle at each end of the axle-box and locked against rotary movement on the axle, cones at the ends of the axle-box, each having a stem portion fitting into the recess at its end of the axle-box and being locked to the box to turn with it, said cones engaging the working faces of the balls, and a screw in the end of the axle provided with a flat head to cover the joint between the axle and the ball-cup at its end and lock the latter against longitudinal movement on the former, substantially as described.

In testimony that I claim the foregoing as my own I have hereto affixed my signature in the presence of two witnesses.

WILLIAM HENRY MAKUTCHAN.

Witnesses:
W. S. BOOTH,
GEO. N. WRIGHT.